(12) United States Patent
Garg et al.

(10) Patent No.: US 9,054,627 B2
(45) Date of Patent: Jun. 9, 2015

(54) METHOD AND APPARATUS TO DRIVE A LINEAR RESONANT ACTUATOR AT ITS RESONANT FREQUENCY

(75) Inventors: Mayank Garg, Richardson, TX (US); David Hernandez-Garduno, Dallas, TX (US); Brandon J. Beckham, Dallas, TX (US); David J. Baldwin, Allen, TX (US); Brett E. Forejt, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 174 days.

(21) Appl. No.: 13/443,741

(22) Filed: Apr. 10, 2012

(65) Prior Publication Data

US 2013/0264973 A1   Oct. 10, 2013

(51) Int. Cl.
*H02K 33/00* (2006.01)
*H02P 25/02* (2006.01)
*H02P 21/00* (2006.01)
*H02K 33/16* (2006.01)

(52) U.S. Cl.
CPC .................................... *H02P 25/027* (2013.01)

(58) Field of Classification Search
USPC .................. 318/114, 119, 122–132
See application file for complete search history.

(56) References Cited

U.S. PATENT DOCUMENTS

| | | | | |
|---|---|---|---|---|
| 6,437,524 | B1 * | 8/2002 | Dimanstein | 318/135 |
| 6,538,402 | B2 * | 3/2003 | Gokturk et al. | 318/128 |
| 6,777,895 | B2 * | 8/2004 | Shimoda et al. | 318/114 |
| 7,843,277 | B2 | 11/2010 | Gregorio et al. | |
| 2003/0102828 | A1 * | 6/2003 | Kusakabe | 318/114 |
| 2010/0153845 | A1 * | 6/2010 | Gregorio et al. | 715/702 |

FOREIGN PATENT DOCUMENTS

EP    1117176 A2 *   7/2001
WO    WO 2004077658 A1 *   9/2004

* cited by examiner

*Primary Examiner* — Paul Ip
*Assistant Examiner* — Said Bouziane
(74) *Attorney, Agent, or Firm* — Alan A. R. Cooper; Frank D. Cimino

(57) ABSTRACT

A method for driving a Linear Resonant Actuator (LRA) is provided. During a first off interval, the back-emf of the LRA is measured. During a first off interval, a timer is started when the back-emf reaches a predetermined threshold, and after a predetermined delay has lapsed following the back-emf reaching the predetermined threshold during the first off interval, the LRA is driven over a drive interval having a length and drive strength. A second off interval is entered following the drive interval, and during the second off interval, the back-emf of the LRA is measured. During the second off interval, the timer is stopped when the back-emf reaches the predetermined threshold. The value from the timer that corresponds to the duration between the back-emf reaching the predetermined threshold during the first off interval and the back-emf reaching the predetermined threshold during the second off interval determines the length.

11 Claims, 6 Drawing Sheets

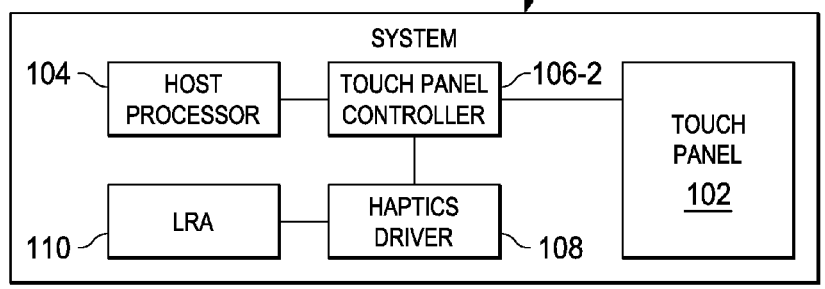
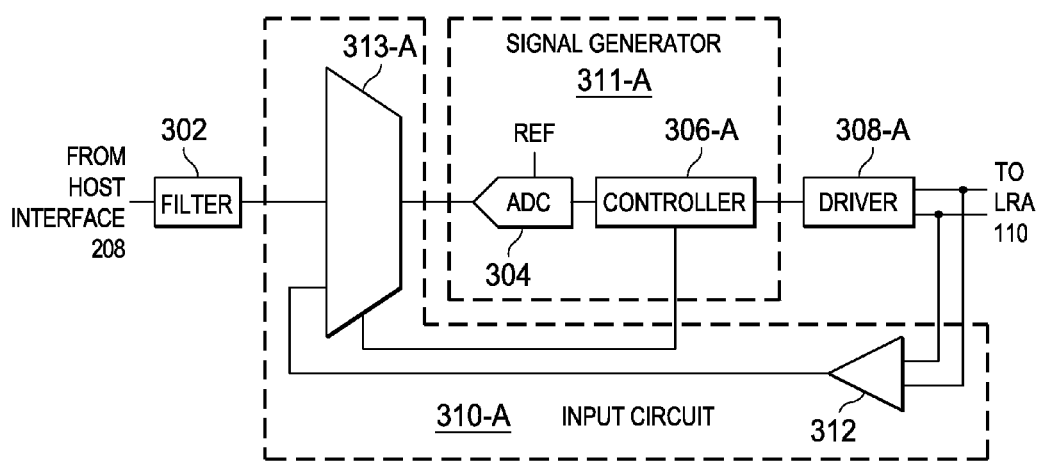

METHOD AND APPARATUS TO DRIVE A LINEAR RESONANT ACTUATOR AT ITS RESONANT FREQUENCY

TECHNICAL FIELD

The invention relates generally to a motor driver and, more particularly, to a motor driver that is configured to drive a Linear Resonant Actuator (LRA) substantially at its resonant frequency.

BACKGROUND

An LRA is a common-place motor used in a variety of applications (including haptics or force-feedback applications). Generally, an LRA has a mass that is secured to a spring, and the mass is moved by use of a coil that is located in proximity to the mass. As a result of their construction, LRAs have a resonant frequency, and, at this resonant frequency, the LRA can be driven efficiently. However, the efficiency falls off sharply as the drive frequency moves away from the resonant frequency of the LRA. For example (as shown in FIG. 1), the vibrational strength is decreased by 25% if the drive frequency is ±2.5 Hz from the resonant frequency (i.e., 175 Hz). Moreover, the resonant frequency of an LRA is not constant; there can be a frequency shift that can be caused by a number of environmental factors (such as mechanical wear, temperature, and LRA orientation or position). As a result this frequency shift, driving an LRA at a substantially constant drive frequency would result in poor efficiency.

One conventional method that has been employed in an attempt to combat some of the issues associated with driving an LRA can be seen in FIG. 2. For this method, a drive interval with a predetermined or pre-defined length is employed. Typically, the LRA is driven over this drive interval. Following the drive interval the driver is shut-off or placed in a high impedance state to allow the back electromotive force (back-emf) to be monitored during a "monitor interval." Once the back-emf reaches a predetermined threshold (in what can be referred to as a "zero-crossing"), a measurement of the back-emf is made after a delay interval, which is subtracted from the input signal. The LRA is then driven over the drive interval having the predetermined length.

A problem with the method is that, when the drive period is divided into its four quadrants $T_1$ to $T_4$ (as shown in FIG. 3), the LRA is only driven during the quadrants $T_1$ and $T_3$. This means that the LRA has a drive period that is less than one-quarter of its resonant period during quadrants $T_1$ and $T_3$ and has about one-quarter of its resonant period during quadrants $T_2$ and $T_4$. The total drive period is, thus, less than the resonant period, resulting in a drive frequency that is greater than the resonant frequency.

Another problem with this method relates to braking Typically, a gain is applied to the back-emf value (measured after the delay interval) and subtracted from the input signal to obtain the output drive amplitude. If the gain is large, the drive amplitude tends to be smaller for the same input, so it is undesirable to have a large gain. However, if the gain is small, braking is weaker and more ineffective because, at the time of braking, the input signal is zero and the output amplitude is negative.

Therefore, there is a need for a method and/or apparatus for driving an LRA with improved performance.

Some examples of conventional systems are: U.S. Pat. No. 7,843,277; and U.S. Patent Pre-Grant Publ. No. 2010/0153845.

SUMMARY

An embodiment of the present invention, accordingly, provides an apparatus. The apparatus comprises an input circuit that is configured to receive an input signal; a signal generator that is coupled to the input circuit and that is configured to output a drive signal that is based at least in part on the input signal, wherein the drive signal includes a plurality of positive drive intervals, a plurality of negative driver intervals, and a plurality of off intervals; and a driver that is coupled to the signal generator and the input circuit, that is configured to drive a linear resonant actuator (LRA), and that is configured to receive the drive signal, wherein the input circuit is configured to measure the back electromotive force (back-emf) of the LRA during the plurality of off periods of the drive signal, and wherein the signal generator adjusts the duration of at least one of the positive and negative intervals based at least in part on the measured back-emf so as to drive the LRA substantially at its resonant frequency.

In accordance with an embodiment of the present invention, the apparatus has an operational mode and an initialization mode, wherein each period of drive signal during the operational mode includes at least one positive drive interval or at least one negative drive interval between two consecutive off intervals, and wherein the measurement circuit is configured to determine whether the back-emf has reached a predetermined threshold in each of the two consecutive off intervals, and the controller is configured to measure the duration between the back-emf reaching the predetermined threshold for the two consecutive off intervals.

In accordance with an embodiment of the present invention, the signal generator further comprises: an analog-to-digital converter (ADC) that is coupled to the input circuit; and a controller that is coupled between the ADC and the driver.

In accordance with an embodiment of the present invention, the measurement circuit further comprises: a sense amplifier that is coupled to the driver; and a multiplexer that is coupled to the sense amplifier, the ADC, and the controller, wherein the multiplexer is configured to receive the input signal, and wherein the controller is configured to control the multiplexer.

In accordance with an embodiment of the present invention, the driver is a class AB driver.

In accordance with an embodiment of the present invention, the driver is a class D driver having: a gate drive circuit that is coupled to the controller; and an H-bridge that is coupled to the gate drive circuit and the sense amplifier.

In accordance with an embodiment of the present invention, the ADC receives a supply voltage as a reference voltage.

In accordance with an embodiment of the present invention, the multiplexer receives a supply voltage as an input, and wherein the controller further comprises: a logic circuit that is coupled to the ADC; and a compensator that is coupled between the logic circuit and the gate drive circuit.

In accordance with an embodiment of the present invention, a method is provided. The method comprises during a first off interval, measuring the back-emf of an LRA; during a first off interval, starting a timer when the back-emf reaches a predetermined threshold; after a predetermined delay has lapsed following the back-emf reaching the predetermined threshold during the first off interval, driving the LRA over a drive interval having a length with a drive strength, wherein the drive strength is based at least in part on an input signal and the back-emf; entering a second off interval following the drive interval; during the second off interval, measuring the back-emf of the LRA; during the second off interval, stopping the timer when the back-emf reaches the predetermined threshold; and setting a value from the timer that corresponds to duration between the back-emf reaching the predetermined threshold during the first off interval and the back-emf reaching the predetermined threshold during the second off interval minus a delay period as the length of the drive interval.

In accordance with an embodiment of the present invention, the predetermined threshold further comprises a first predetermined threshold, and wherein the drive interval further comprises a first drive interval, and wherein the method further comprises the step of performing initialization by: retrieving the length; determining whether the back-emf magnitude of the LRA is less than a second predetermined threshold; and if the back-emf magnitude is less than the second predetermined threshold, driving the LRA over a second drive interval of one-half of the length.

In accordance with an embodiment of the present invention, the first off interval further comprises a first delay interval following the time when the back-emf reaches the predetermined threshold, and wherein the second off interval further comprises a second delay interval following the time when the back-emf reaches the predetermined threshold.

In accordance with an embodiment of the present invention, the first and second delay intervals are about 200 μs.

In accordance with an embodiment of the present invention, an apparatus is provided. The apparatus comprises a touch panel; a touch panel controller that is coupled to touch panel, wherein the touch panel includes an interface; an LRA; and a haptics driver having an operational mode and an initialization mode, wherein the haptics driver includes: an input circuit that is coupled to receive an input signal from the interface; a signal generator that is coupled to the input circuit and that is configured to output a drive signal that is based at least in part on the input signal, wherein the drive signal includes a plurality of positive drive intervals, a plurality of negative drive intervals, and a plurality of off intervals; and an LRA driver that is coupled to the signal generator, the input circuit, and the LRA, wherein the LRA driver is configured to receive the drive signal from the signal generator, and wherein the input circuit is configured to measure the back-emf of the LRA during the plurality of off periods of the drive signal, and wherein each period of drive signal during the operational mode includes at least one positive drive interval or at least one negative drive interval between two consecutive off intervals, and wherein the measurement circuit is configured to determine whether the back-emf has reached a predetermined threshold in each of the two consecutive off intervals, and the controller is configured to measure the duration between the back-emf reaching the predetermined threshold for the two consecutive off intervals, and wherein the signal generator adjusts the duration of at least one of the positive and negative intervals based at least in part on the duration between the back-emf reaching the predetermined threshold for the two consecutive off intervals so as to drive the LRA substantially at its resonant frequency.

In accordance with an embodiment of the present invention, the ADC further comprises a first ADC, and wherein the interface further comprises a first interface, and wherein the touch panel controller further comprises: a second interface that is coupled to the touch panel; a second ADC that is coupled to the second interface; and a pre-processing circuit that is coupled to ADC and the first interface.

In accordance with an embodiment of the present invention, the apparatus further comprises a host processor that is coupled to the second interface.

In accordance with an embodiment of the present invention, the LRA driver further comprises a class AB driver.

In accordance with an embodiment of the present invention, the LRA driver further comprises: a gate drive circuit that is coupled to the controller; and an H-bridge that is coupled between the gate drive circuit and the LRA.

In accordance with an embodiment of the present invention, the haptics driver further comprises a filter that is coupled between the second interface and the multiplexer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a diagram of an example of a system in accordance with the present invention;

FIGS. 7 and 8 are diagrams of examples of the haptics drivers of FIGS. 4-6; and

DETAILED DESCRIPTION

Figure 1:
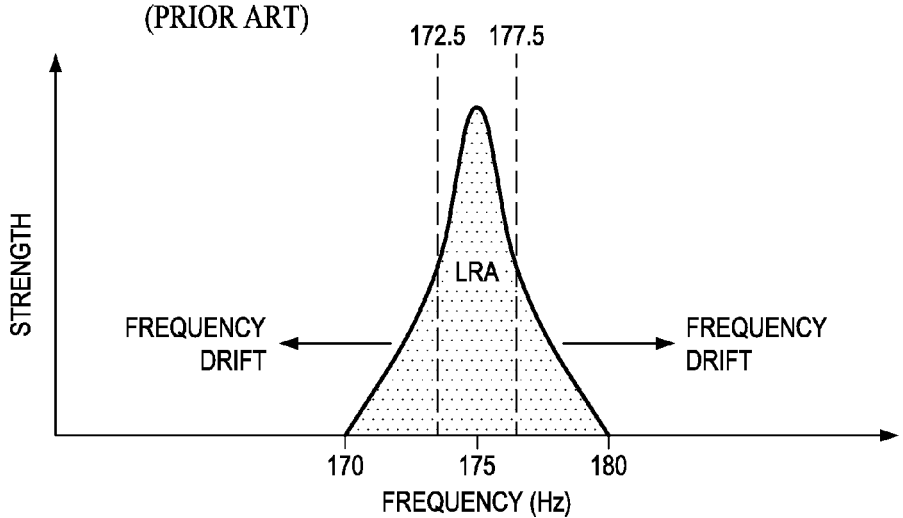
FIG. 1 is a diagram depicting an example of the general operation of an LRA.
Figure 2:
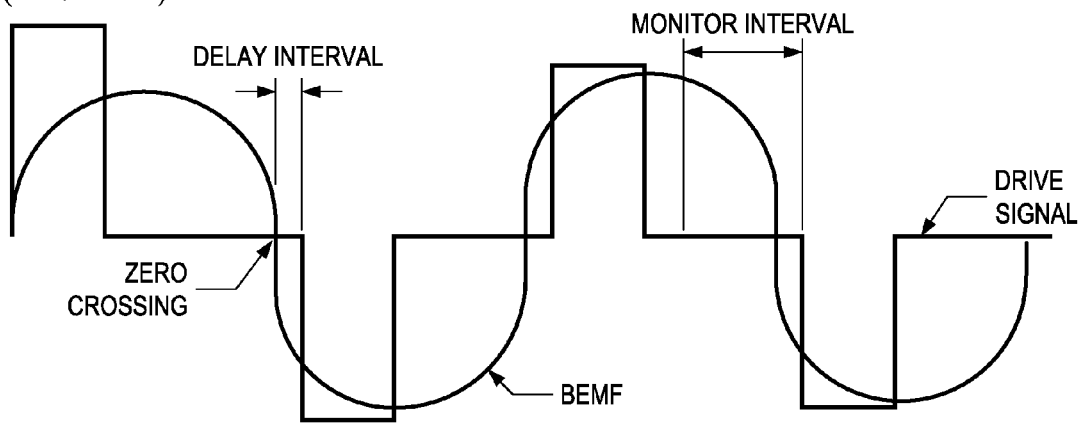
FIGS. 2 and 3 are diagrams of an example of a conventional driving method for an LRA.
Figure 3:
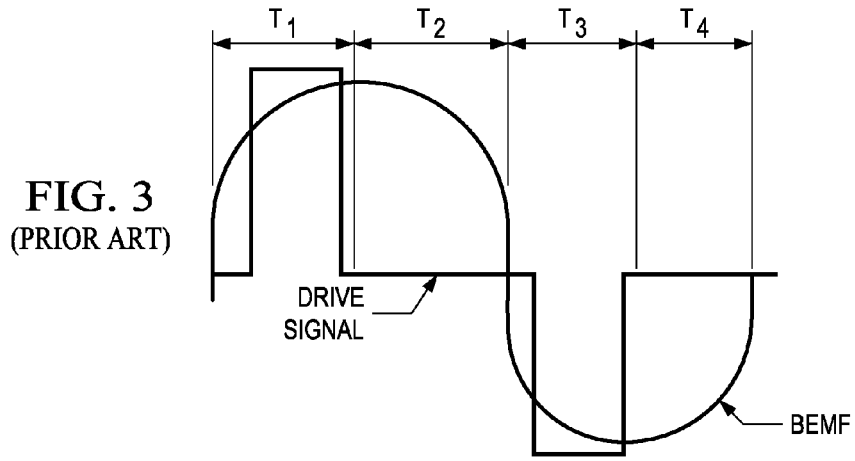

Refer now to the drawings wherein depicted elements are, for the sake of clarity, not necessarily shown to scale and wherein like or similar elements are designated by the same reference numeral through the several views.

Figure 4:
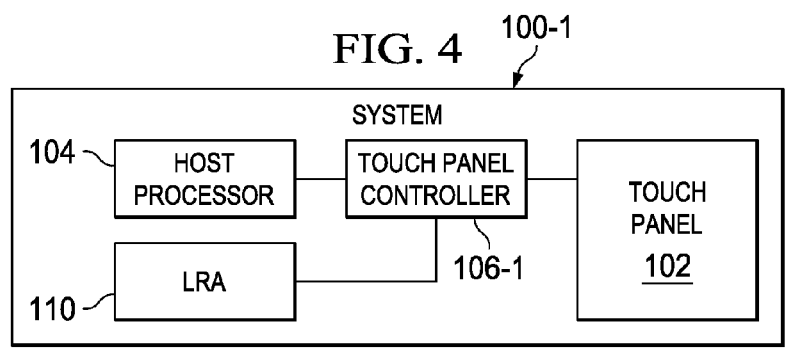
FIG. 4 is a diagram of an example of a system in accordance with the present invention.
Figure 5:
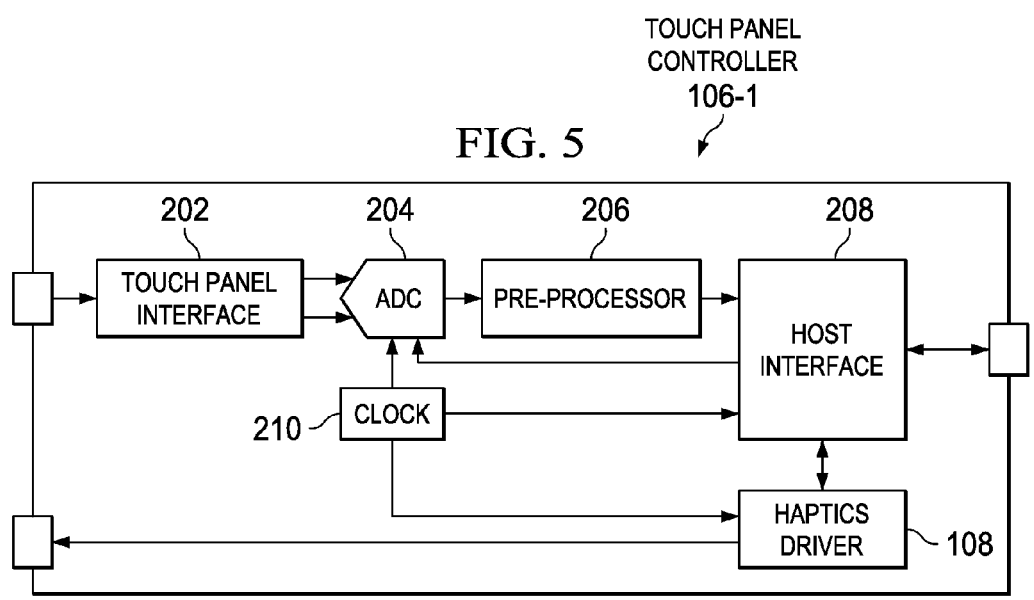
FIG. 5 is a diagram of an example of the touch panel controller of FIG. 4.

Turning to FIGS. 4-6, examples of systems 100-1 and 100-2 in accordance with the present invention can be seen. These systems 100-1 and 100-2 can, for example, be mobile phones, tablet computers, or other such devices having a touch panel 102. Typically, in these systems 100-1 and 100-2, there is a host process 104 (which can, for example, be an applications processor and/or baseband processor) and a LRA 110 (which can provide haptics effects like touch button effects that can vary based on amplitude and duration of an applied drive signal). The difference between systems 100-1 and 100-2, however, generally lies between the touch panel controllers 106-1 and 106-2. Each of the touch panel controllers 106-1 and 106-2 include a touch panel interface 202 (which allows for measurements of the touch panel 102 to be made), an analog-to-digital converter (ADC) 204 (which can, for example, be a successive approximation register or SAR ADC or a sigma-delta ADC), a pre-processor 206, a clock 210, and a host interface 208. With controller 106-1, the haptics driver 108 (which drives the LRA 110) is included (i.e., as part of the same integrated circuit or IC), and with controller 106-2, the haptics driver 108 is separate from controller 106-2 (i.e., different IC). Other combinations (where portions of the haptics driver 108 are included with the controller 106) may also be used.

The haptics driver 108 (which is labeled 108-A for FIG. 7) is able to drive the LRA 110 (so as to have different haptics effects) based on an input signal from the host interface 208. Usually, this input signal from host interface 208 is filtered by filter 302 and applied to the input circuit 310-A (which generally comprises multiplexer 313-A and sense amplifier 312). The multiplexer 313-A is also generally controlled by the controller 306-A of signal generator 311-A, but, when set to apply the filtered input signal, the ADC 304 (which receives a reference signal REF and may, for example, be a SAR ADC) is able to generate a digital representation of the filtered input signal for the controller 306-A that generates a drive signal for driver 308-A (which can, for example, be a class AB driver or a class D driver). The sense amplifier 312 (which is coupled to the driver 308-A) is then able to perform back-emf measurements so as to allow the controller 306-A to adjust the drive signal to substantially drive the LRA 110 at its resonant frequency.

Figure 8:
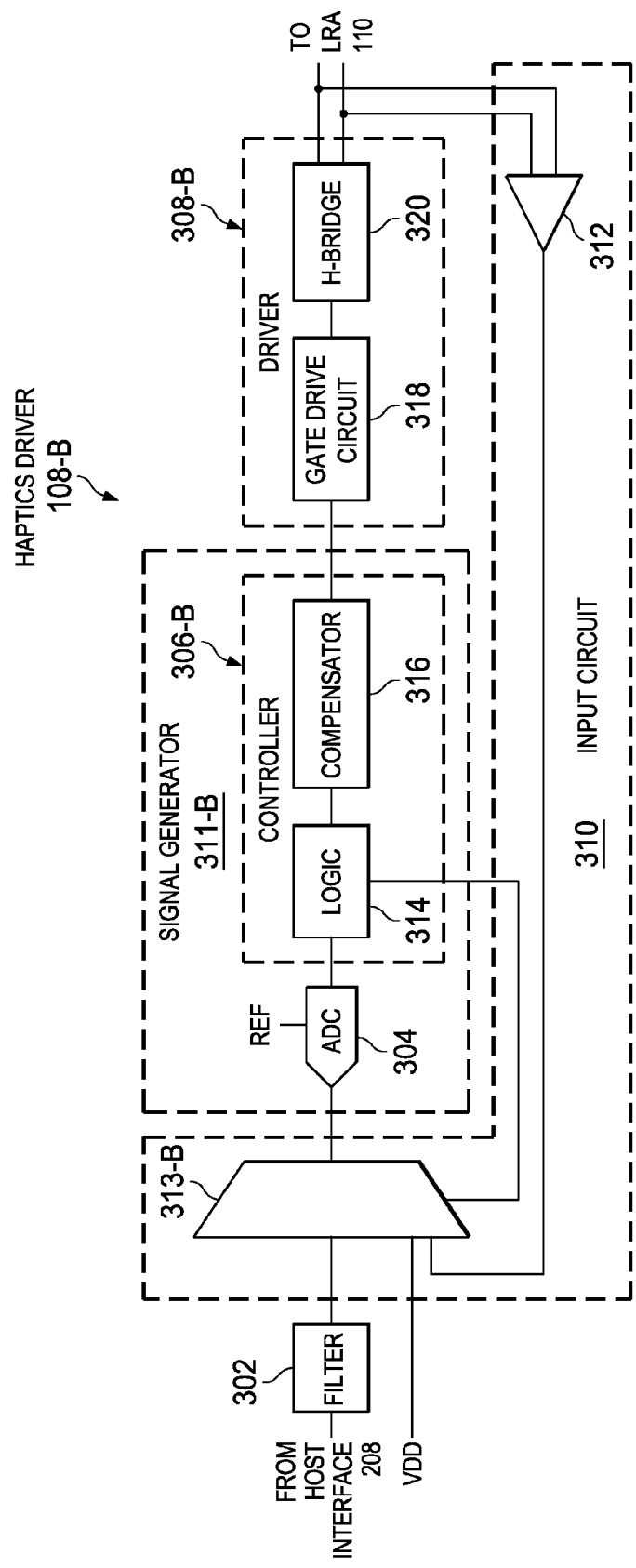

When a class D driver is employed as driver 308-A or 308-B (as shown in FIG. 8), several configurations can be employed. When employed as a class D driver, drivers 308-A and 308-B would employ a gate drive circuit 318 and H-bridge 320 (as shown in FIG. 8). In one configuration, the reference voltage REF for ADC 304 can be seen to the supply voltage VDD, and, in an alternative configuration (shown in FIG. 8), multiplexer 313-B can receive the supply voltage VDD as an input, while the reference voltage REF is generally constant. With this alternative configuration, the controller 306-B would include logic 314 and a compensator 316 (which would use the information gathered from a measurement of the supply voltage VDD to provide adequate compensation to the drive signal).

Figure 9:
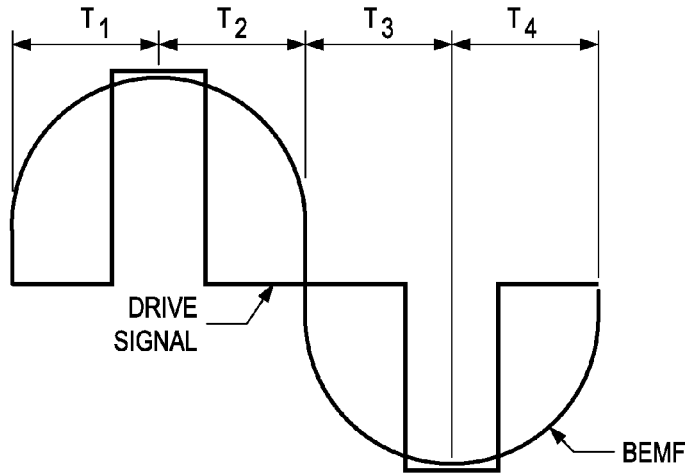
FIGS. 9-11 are diagrams depicting examples of the general operation of the haptics drivers of FIGS. 4-8.
Figure 10:
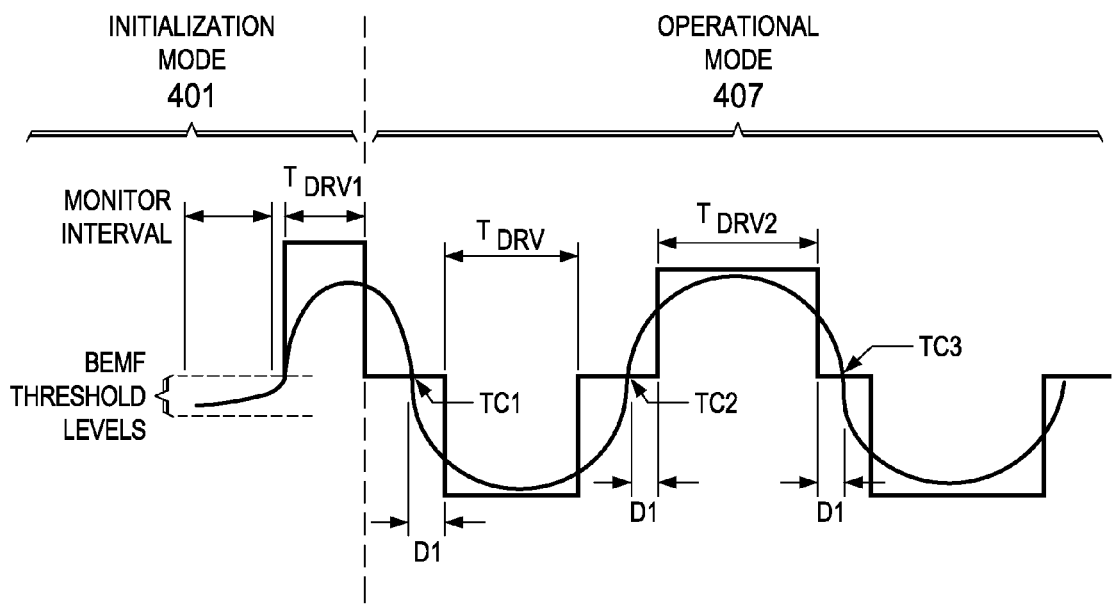
Figure 11:
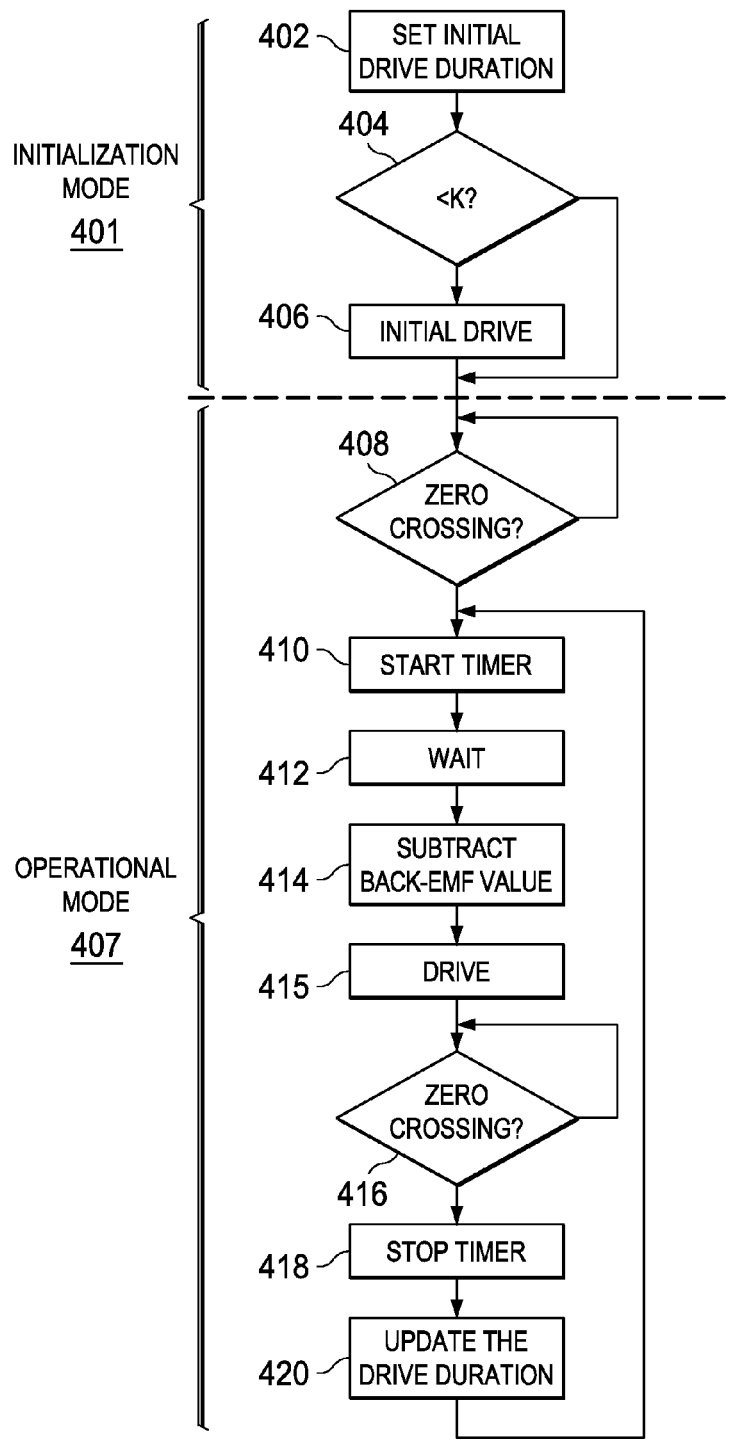

In operation (as shown in FIGS. 9-11), the controller 306-A or 306-B (hereinafter 306) employs a drive signal that substantially matches the resonant frequency of the LRA 110. To do this, the controller 306 centers or aligns the positive and negative intervals of the drive signal with the back-emf so that the LRA is driven in each quadrant $T_1$ to $T_4$ (as shown in FIG. 9), and the controller 306 uses an initialization mode 401 and an operational mode 407 (as shown in FIGS. 10 and 11). During the initialization mode 401, the controller 306 retrieves a saved drive interval $T_{DRV2}$ having a duration or length from memory (which can be included as part of the controller 306) in step 402. During a monitoring interval, where the multiplexer 313-A or 313-B (hereinafter 313) is set to provide a back-emf measurement from sense amplifier 312 to ADC 304, the controller 306 determines whether the back-emf magnitude of LRA 110 is less than a predetermined value k. If the back-emf is less than value k, the LRA 110 is presumed to be "stopped," and the LRA is initially driven for drive interval $T_{DRV1}$ (which is typically one-half of interval $T_{DRV2}$) in step 406. The controller 306 can then enter the operational mode 407 in step 408. When entering the operational mode 407, the driver 308-A or 308-B (hereinafter 308) is set to an off or high impedance state during an off interval. During this off interval, multiplexer 313 is set so that controller 306 is able to receive the back-emf from sense amplifier 312 to determine whether the back-emf has reached a zero-crossing (i.e., reached a predetermined threshold) in step 408. Once the zero-crossing has occurred, a timer (which can be part of controller 306) is started at time TC1 in step 410, and, after a delay interval D1 in step 412, the measured back-emf value is measured and subtracted from the input signal (which is measured by virtue of setting multiplexer 313 to provide the input signal to ADC 304) in order for a proper or desired amplitude to be achieved. The LRA 110 is then driven in step 415 over drive interval $T_{DRV2}$. Once the interval $T_{DRV2}$ has lapsed, the controller enters a subsequent off interval so that the timer can be stopped at time TC2 when the back-emf reaches the threshold in step 418. In step 420, the duration or time period between the zero-crossings in the two consecutive off intervals less or minus a delay period (which is typically twice the delay interval D1) can be set as the drive duration or the length of the drive interval. Then, in starting again at step 410, the LRA 110 is driven after the delay interval D1. This drive duration can then be continually adjusted for each positive or negative drive interval (i.e., between times TC2 and TC3).

One other feature that is implemented in controller 306 is an improved braking and acceleration ability. Typically, in step 414, the controller 306 applies a gain to the back-emf before subtracting it from the input signal. With conventional techniques, the gain was usually fixed, but with haptics driver 108, the controller 306 can adjust the gain applied to the back-emf depending on whether braking or acceleration is employed or may be needed.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:
1. An apparatus comprising:
an input circuit that is configured to receive an input signal;
a signal generator that is coupled to the input circuit and that is configured to output a drive signal that is based at least in part on the input signal, wherein the drive signal includes a plurality of positive drive intervals, a plurality of negative drive intervals, and a plurality of off intervals; and
a driver that is coupled to the signal generator and the input circuit, that is configured to drive a linear resonant actuator (LRA), and that is configured to receive the drive signal, wherein the input circuit is configured to measure the back electromotive force (back-emf) of the LRA during the plurality of off periods of the drive signal, and wherein the signal generator adjusts the duration of at least one of the positive and negative intervals based at least in part on the measured back-emf so as to drive the LRA substantially at its resonant frequency,
wherein the apparatus has an operational mode and an initialization mode, wherein each period of drive signal during the operational mode includes at least one positive drive interval or at least one negative drive interval between two consecutive off intervals, and wherein a measurement circuit is configured to determine whether the back-emf has reached a predetermined threshold in each of the two consecutive off intervals, and a controller is configured to measure the duration between the back-emf reaching the predetermined threshold for the two consecutive off intervals,
wherein the signal generator further comprises:
an analog-to-digital converter (ADC) that is coupled to the input circuit; and
wherein the controller that is coupled between the ADC and the driver,
wherein the measurement circuit further comprises:
a sense amplifier that is coupled to the driver; and
a multiplexer that is coupled to the sense amplifier, the ADC, and the controller, wherein the multiplexer is configured to receive the input signal, and wherein the controller is configured to control the multiplexer,
wherein the driver is a class D driver having:
a gate drive circuit that is coupled to the controller; and
an H-bridge that is coupled to the gate drive circuit and the sense amplifier
wherein the multiplexer receives a supply voltage as an input, and wherein the controller further comprises:
a logic circuit that is coupled to the ADC; and
a compensator that is coupled between the logic circuit and the gate drive circuit.

2. The apparatus of claim 1, wherein the driver is a class AB driver.

3. The apparatus of claim 1, wherein the ADC receives a supply voltage as a reference voltage.

4. An apparatus comprising:
a touch panel;
a touch panel controller that is coupled to a touch panel, wherein the touch panel includes an interface;
a linear resonant actuator (LRA); and
a haptics driver having an operational mode and an initialization mode, wherein the haptics driver includes:
an input circuit that is coupled to receive an input signal from the interface;
a signal generator that is coupled to the input circuit and that is configured to output a drive signal that is based at least in part on the input signal, wherein the drive signal includes a plurality of positive drive intervals, a plurality of negative drive intervals, and a plurality of off intervals; and
a LRA driver that is coupled to the signal generator, the input circuit, and the LRA, wherein the LRA driver is configured to receive the drive signal from the signal generator, and wherein the input circuit is configured to measure the back-emf of the LRA during the plurality of off periods of the drive signal, and wherein each period of drive signal during the operational mode includes at least one positive drive interval or at least one negative drive interval between two consecutive off intervals, and wherein the measurement circuit is configured to determine whether the back-emf has reached a predetermined threshold in each of the two consecutive off intervals, and the touch panel controller is configured to measure the duration between the back-emf reaching the predetermined threshold for the two consecutive off intervals, and wherein the signal generator adjusts the duration of at least one of the positive and negative intervals based at least in part on the duration between the back-emf reaching the predetermined threshold for the two consecutive off intervals so as to drive the LRA substantially at its resonant frequency, and wherein the touch panel controller further comprises:
a logic circuit that is coupled to an analog-to-digital controller (ADC);
a gate drive circuit; and
a compensator that is coupled between the logic circuit and the gate drive circuit.

5. The apparatus of claim 4, wherein the signal generator further comprises:
an ADC that is coupled to the input circuit; and
a controller that is coupled between the ADC and the LRA driver.

6. The apparatus of claim 5, wherein the measurement circuit further comprises:
a sense amplifier that is coupled to the LRA driver; and
a multiplexer that is coupled to the sense amplifier, the ADC, and the controller, wherein the multiplexer is configured to receive the input signal, and wherein the controller is configured to control the multiplexer.

7. The apparatus of claim 6, wherein the ADC further comprises a first ADC, and wherein the interface further comprises a first interface, and wherein the touch panel controller further comprises:
a second interface that is coupled to the touch panel;
a second ADC that is coupled to the second interface; and
a pre-processing circuit that is coupled to ADC and the first interface.

8. The apparatus of claim 7, wherein the apparatus further comprises a host processor that is coupled to the second interface.

9. The apparatus of claim 8, wherein the LRA driver further comprises a class AB driver.

10. The apparatus of claim 8, wherein the LRA driver further comprises:
a gate drive circuit that is coupled to the controller; and
an H-bridge that is coupled between the gate drive circuit and the LRA.

11. The apparatus of claim 10, wherein the haptics driver further comprises a filter that is coupled between the second interface and the multiplexer.

* * * * *